US012662164B2

(12) United States Patent
Won et al.

(10) Patent No.: US 12,662,164 B2
(45) Date of Patent: Jun. 23, 2026

(54) SAFETY BOARD SYSTEM

(71) Applicant: SB engineering CO.,LTD., Seongnam-si (KR)

(72) Inventors: Yong Seok Won, Seoul (KR); Seung Hyun Yeo, Gwangmyeong-si (KR)

(73) Assignee: SB engineering CO., LTD., Seongnam-si (KR)

( * ) Notice: Subject to any disclaimer, the term of this patent is extended or adjusted under 35 U.S.C. 154(b) by 243 days.

(21) Appl. No.: 18/363,227

(22) Filed: Aug. 1, 2023

(65) Prior Publication Data

US 2025/0010887 A1      Jan. 9, 2025

(30) Foreign Application Priority Data

Jul. 7, 2023      (KR) ........................ 10-2023-0088149

(51) Int. Cl.
| | |
|---|---|
| *B60W 60/00* | (2020.01) |
| *B60W 30/12* | (2020.01) |
| *B60W 50/14* | (2020.01) |
| *B66B 9/00* | (2006.01) |

(Continued)

(52) U.S. Cl.
CPC ...... *B60W 60/00253* (2020.02); *B60W 30/12* (2013.01); *B60W 50/14* (2013.01); *B60W 60/0015* (2020.02); *B66B 9/003* (2013.01); *G08G 1/054* (2013.01); *G08G 1/166* (2013.01); *B60W 2050/143* (2013.01); *B60W 2520/06* (2013.01); *B60W 2540/041* (2020.02); *B60W 2540/049* (2020.02); *B60W 2540/227* (2020.02);

(Continued)

(58) Field of Classification Search
CPC ........... B60W 60/00253; B60W 30/12; B60W 50/14; B60W 60/0015; B60W 2050/143; B60W 2520/06; B60W 2540/041; B60W 2540/049; B60W 2540/227; B60W 2252/53; B60W 2554/80; B66B 9/003; G08G 1/054; G08G 1/166; B62D 47/00; H04W 4/021; H04W 4/029
See application file for complete search history.

(56) References Cited

U.S. PATENT DOCUMENTS

| | | | | | |
|---|---|---|---|---|---|
| 3,493,097 | A | * | 2/1970 | Karr ........................ | B65G 23/20 |
| | | | | | 198/833 |
| 5,836,423 | A | * | 11/1998 | Kunczynski .............. | B66B 9/00 |
| | | | | | 187/245 |
| 9,498,884 | B2 | * | 11/2016 | Ha ......................... | B25J 9/1669 |

(Continued)

FOREIGN PATENT DOCUMENTS

| | | | | | |
|---|---|---|---|---|---|
| CN | 106429731 | A | * | 2/2017 | ............. B66B 11/00 |
| CN | 108100827 | A | * | 6/2018 | ............. B66B 11/04 |

(Continued)

OTHER PUBLICATIONS

Translated CN-110158510-A (Year: 2025).*

(Continued)

*Primary Examiner* — James A Shriver, II
*Assistant Examiner* — Ian Bryce Shelton
(74) *Attorney, Agent, or Firm* — Studebaker Brackett PLLC

(57)      ABSTRACT

The present invention relates to a safety board system. The safety board system of the present invention can directly assist the movement of mobility disadvantaged persons crossing the pedestrian crossing, leading to rapid and safe crossing.

9 Claims, 17 Drawing Sheets

(51) Int. Cl.
   G08G 1/054 (2006.01)
   G08G 1/16 (2006.01)
(52) U.S. Cl.
   CPC ..... *B60W 2552/53* (2020.02); *B60W 2554/80* (2020.02)

(56) References Cited

U.S. PATENT DOCUMENTS

| | | | | |
|---|---|---|---|---|
| 2012/0101632 A1* | 4/2012 | Ha | ............................ | B25J 9/1682 |
| | | | | 901/1 |
| 2023/0075541 A1* | 3/2023 | Yoon | ..................... | B60R 21/0136 |

FOREIGN PATENT DOCUMENTS

| | | | | | |
|---|---|---|---|---|---|
| CN | 108118569 A | * | 6/2018 | ............... | G08G 1/00 |
| CN | 109695186 A | * | 4/2019 | ............. | E01C 1/002 |
| CN | 110158510 A | * | 8/2019 | ............... | G08G 1/07 |
| CN | 110264704 A | * | 9/2019 | ............. | G08G 1/005 |
| EA | 201600310 A1 | | 9/2017 | | |
| EA | 029456 B1 | * | 3/2018 | | |
| EP | 0842888 A1 | * | 5/1998 | ........... | B66B 1/2491 |
| FR | 2574737 A1 | * | 6/1986 | ............... | B66B 9/00 |
| FR | 2576888 A1 | * | 8/1986 | ............... | B66B 9/00 |
| JP | H11-083981 A | | 3/1999 | | |
| JP | 2009101774 A | * | 5/2009 | | |
| JP | 2017-149520 A | | 8/2017 | | |
| JP | 2021-064238 A | | 4/2021 | | |
| KR | 20-2008-0003298 U | | 8/2008 | | |
| KR | 20080003298 U | * | 8/2008 | ............. | B66B 7/066 |
| KR | 101317334 B1 | * | 10/2013 | | |
| KR | 10-1792112 B1 | | 10/2017 | | |
| KR | 10-2021-0061975 A | | 5/2021 | | |
| KR | 20210061975 A | * | 5/2021 | ............. | G08G 1/075 |
| KR | 102381877 B1 | * | 3/2022 | ............. | G08G 1/005 |
| KR | 10-2436111 B1 | | 8/2022 | | |
| WO | WO-0132542 A1 | * | 5/2001 | ............. | B66B 9/02 |
| WO | WO-2017038883 A1 | * | 3/2017 | ............. | G06V 20/58 |

OTHER PUBLICATIONS

Translated JP-2009101774-A (Year: 2025).*
"Notice of Reasons for Refusal" Office Action issued in JP 2023-127243; mailed by the Japanese Patent Office on Nov. 5, 2024.
"Decision to Grant a Patent" Office Action issued in JP 2023-127243; mailed by the Japanese Patent Office on Mar. 18, 2025.
An Office Action mailed by the Korean Intellectual Property Office on Sep. 12, 2023, which corresponds to Korean Patent Application No. 10-2023-0088149 and is related to U.S. Appl. No. 18/363,227.
The extended European search report issued by the European Patent Office on Jan. 31, 2024, which corresponds to European Patent Application No. 231886441.7-1017 and is related to U.S. Appl. No. 18/363,227.

* cited by examiner

-- Prior Art --

-- Prior Art --

-- Prior Art --

SAFETY BOARD SYSTEM

CROSS-REFERENCE TO RELATED PATENT APPLICATION

This application claims the benefit of Korean Patent Application No. 10-2023-0088149, filed on Jul. 7, 2023, in the Korean Intellectual Property Office, the disclosure of which is incorporated herein in its entirety by reference.

BACKGROUND OF THE INVENTION

1. Field of the Invention

The present invention relates to a safety board system installed on a pedestrian crossing to assist individuals with reduced mobility in safely crossing the pedestrian crossing, and more particularly, to a safety board system in which a shuttle carrying passengers travels back and forth across the pedestrian crossing to transport the passengers to opposite lift platforms, and the shuttle approaching the lift platform changes its direction by a certain angle to position a door unit formed on the side thereof at the lift platform, the safety board system being selectively operated by a control device.

2. Description of the Related Art

People who have difficulties in mobility in their daily lives are called "mobility disadvantaged persons", and persons with disabilities, the elderly, pregnant women, caregivers of infants, and children are usually classified as the mobility disadvantaged persons. The "Act on Promotion of the Transportation Convenience of Mobility Disadvantaged Persons", enacted in 2005 to guarantee the right to pursue the dignity, value, and happiness as a human being, aims to install convenient mobility equipment to guarantee the right to use safely, conveniently, and without discrimination, all means of transportation, passenger facilities, and roads used by persons, other than the mobility disadvantaged persons.

The "Act on Promotion of the Transportation Convenience of Mobility Disadvantaged Persons" defines the convenient mobility equipment as equipment and facilities configured to provide transportation convenience to mobility disadvantaged persons in using any means of transportation, passenger facilities, or roads, such as wheelchair lifts, elevators for persons with disabilities, sidewalks for persons with disabilities, resting places where nursing mothers can breast-feed infants, etc.

Meanwhile, the pedestrian crossing, which is the representative road furniture installed at the crosswalk of the road, is a very dangerous place even for ordinary pedestrians. As of 2020, the number of pedestrian traffic accidents reached 36,601 annually, resulting in 1,093 fatalities and 36,939 injuries. Among these accidents, there were 9,739 incidents involving elderly pedestrians, with 628 fatalities and 9,233 injuries, and there were 2,079 accidents involving child pedestrians, resulting in 16 fatalities and 2,135 injuries.

Despite the significant number of pedestrian traffic accidents occurring at pedestrian crossings, particularly involving mobility disadvantaged persons, the current convenient mobility equipment installed at the pedestrian crossings are limited to acoustic signals, braille blocks, lowered speed bumps, LED blocks, etc., and facilities specifically designed for mobility disadvantaged persons are not properly installed, creating a situation where their needs are not adequately addressed.

In particular, elderly people who walk slowly compared to the general population are frequently in danger because the pedestrian signal changes even though they have not crossed the pedestrian crossing, and this situation has led to traffic accidents caused by right-turning vehicles or inattentive drivers.

As a prior art proposed for mobility disadvantaged persons walking on pedestrian crossings, there is Korean Patent Application Publication No. 10-2021-0061975 (published on May 28, 2021, hereinafter referred to as 'prior-art document 1'). As shown in FIG. 1A, prior-art document 1 proposes a moving walkway 1 for pedestrian movement, a piezoelectric sensor 2 for detecting the presence of a pedestrian, a camera 3 for detecting a vehicle and a pedestrian, an opening/closing device 4 for preventing pedestrians from jaywalking, and a traffic light 5 integrated with the camera 3.

The above-mentioned prior-art document 1 proposes a technology at the conceptual stage for the pedestrian convenience of socially vulnerable people; however, as the moving walkway 1 is installed at the top of the road where vehicles move, it is difficult to ensure durability due to the weight of passing vehicles, and the construction and maintenance of the moving walkway (1) require significant costs, making it impractical for implementation.

There is also Korean Patent No. 10-1792112 (registered on Oct. 25, 2017, hereinafter referred to as 'prior-art document 2'). As shown in FIG. 1B, prior-art document 2 proposes guide rails 6 that are formed along the boundaries of a pedestrian crossing and robots 7 that move along the guide rails 6 and send out various warning signals when an obstacle is detected based on signal information received from a controller 8.

According to the above-mentioned prior-art document 2, it is proposed to allow the pedestrian to move a safe position based on real-time monitoring of position information for the safety of the pedestrian; however, it cannot provide direct assistance to the movement of physically handicapped persons.

Moreover, there is also Korean Patent No. 10-2381877 (registered on Mar. 29, 2022, hereinafter referred to as 'prior-art document 3'). As shown in FIG. 1C, prior-art document 3 proposes an unmanned electric cart 9 which operates autonomously on a pedestrian crossing by transmitting and receiving a signal to and from an operation guidance unit 9a installed at the pedestrian crossing.

According to the above-mentioned prior-art document 3, it is proposed to allow the elderly and disabled individuals to board the electric cart 9 and cross the pedestrian crossing within a predetermined pedestrian signal time; however, in order for the electric cart 9, which can only move back and forth without changing its direction, to enter from the road to the sidewalk to allow passengers to get in and out of the electric cart 9, there must be sufficient space in the sidewalk. As a result, if the sidewalk is narrow, the electric cart 9 cannot be installed on the sidewalk, and even if the sidewalk is wide, the electric cart's presence may significantly narrow the available space for pedestrians, causing inconvenience.

PRIOR-ART DOCUMENTS

Patent Documents

Patent document 1: Korean Patent Application Publication No.: 10-2021-0061975 (published on May 28, 2021)

Patent document 2: Korean Patent No.: 10-1792112 (reg-
istered on Oct. 25, 2017)

Patent document 2: Korean Patent No.: 10-2381877 (reg-
istered on Mar. 29, 2022)

SUMMARY OF THE INVENTION

The present invention has been made in an effort to solve
the above-described problems associated with prior art, and
an object of the present invention is to provide a pedestrian
crossing safety board system which directly assists a mobil-
ity disadvantaged person in safely crossing a pedestrian
crossing, ensures the safety during the movement of the
mobility disadvantaged person, and does not impede the safe
movement of other pedestrians.

Another object of the present invention is to provide a
safety board system which allows a shuttle to smoothly
change its direction even in a narrow space to minimize a
reduction in the width of a sidewalk due to the presence of
a lift platform installed on the sidewalk, thereby reducing
inconvenience to pedestrians.

Still another object of the present invention is to provide
a safety board system that can prevent speeding and signal
violations of vehicles passing through a pedestrian crossing,
and if a person or object such as a vehicle enters or is
expected to enter the pedestrian crossing, decelerate or stop
the shuttle to ensure the safety.

Yet another object of the present invention is to provide a
safety board system which allows mobility disadvantaged
persons to complete their crossing within a predetermined
pedestrian signal time, contributes to reducing the occur-
rence of traffic accidents on a pedestrian crossing to enhance
the smooth flow of road traffic, and guides pedestrians to
walk on the right side of the pedestrian crossing, thereby
ensuring the pedestrian's safety as well.

A further object of the present invention is to provide a
safety board system which can create a new concept of a city
and enhance the city's brand power with a design in terms
of urban aesthetics.

In order to achieve the above-mentioned objects and solve
the problems associated with prior art, the present invention
provides a safety board system that is installed on a pedes-
trian crossing to assist the movement of mobility disadvan-
taged persons, the safety board system comprising: a pair of
lift platforms 10 that are formed on sidewalks on both sides
of the pedestrian crossing; one or more shuttles 20 that move
along a predetermined travel path C within a travel area S set
on the pedestrian crossing to travel back and forth between
the pair of lift platforms 10 and transport passengers to the
opposite lift platforms 10; a driving device 30 that moves the
shuttles 20; and a control device 40 that selectively operates
the driving device 30.

The driving device 30 may be provided in the shuttle 20
and comprise a plurality of wheels 32 that are rotated by a
drive unit 31 and a sensing unit 34 that detects the position
and direction of the travel path C to steer the wheels 32.

A pair of travel paths C may be set on the pedestrian
crossing to allow bi-directional movement, and both ends of
the pair of travel paths C may be connected to each other by
a pair of direction changing units J to form a loop structure
in which the shuttles 20 circulate.

The lift platform 10 may be configured to face a door unit
22 formed on the side of the shuttle 20 when the shuttle 20
changes its direction by a certain angle from the travel path
C parallel to the pedestrian crossing.

The safety board system may comprise a direction chang-
ing device 120 that rotates the shuttle 20 such that the door unit 22 of the shuttle 20 entering the lift platform 10 faces
the lift platform 10 and rotates the shuttle 20 such that the
door unit 22 of the shuttle 20 exiting the lift platform 10 is
parallel to the travel path C.

The direction changing device 120 may comprise: a pivot
axis 121 that is accommodated in an entry end of the shuttle
20 to protrude therefrom; and a plurality of wheel units 122
that are accommodated in the shuttle 20 at positions different
from the pivot axis 121 and protrude along with the pivot
axis 121 from the bottom of the shuttle 20 to rotate the
shuttle 20 around the pivot axis 121.

The direction changing device 120 may comprise: a
steering unit 123 that is connected to a pair of wheels 32
provided at an exit end of the shuttle 20 to form the driving
device 30 and configured to change the direction of each of
the connected wheels 32 at different predetermined angles to
rotate the shuttle 20 by the driving of the pair of wheels 32
after the direction change.

The direction changing device 120 may form a pair of
entry-end-centered-rotation units 130 that are symmetrically
arranged in the forward and backward directions of the
shuttle 20, rotates the shuttle 20 entering the lift platform 10
by a predetermined angle around the entry end to enter the
lift platform 10, and reversely rotates the entered shuttle 20
by a predetermined angle around the entry end to exit along
the travel path C taken at the time of entry.

The direction changing device 120 may form: an entry-
end-centered-rotation unit 130 that is provided in the shuttle
20 to rotate the shuttle 20 entering the lift platform 10 by a
predetermined angle around the entry end to enter the lift
platform 10; and an exit-end-centered-rotation unit 140 that
is provided at a different position of the shuttle 20 to rotate
the entered shuttle 20 by a predetermined angle around the
exit end to exit along a travel path C different from the travel
path C taken at the time of entry.

The safety board system may comprise a speeding detec-
tion device 110 that captures an image of a vehicle traveling
nearby and detects and records a traveling speed of the
corresponding vehicle, and if the detected traveling speed of
the vehicle exceeds a predetermined reference speed, the
speeding detection device 110 may transmit the image of the
corresponding vehicle and traveling speed information to a
designated server.

The sensing unit 34 may detect the position and direction
of a boundary line formed on the road surface of the
pedestrian crossing, and if the shuttle 20 deviates from a
predetermined area of the boundary line, the control unit 33
may steer the shuttle 20 again to prevent the deviation of the
shuttle 20; and an anti-collision sensor 80 may detect a
person or object present in front of the travel path C of the
shuttle 20, and if the person or object enters or is expected
to enter a safety distance, the control unit 33 may decelerate
or stop the shuttle so that the shuttle travels while maintain-
ing the safety distance.

The shuttle 20 may comprise an LED lamp 24 mounted on
the outside of the shuttle 20 to indicate the state of the
shuttle's normal operation, the state of the shuttle's signal
system, or an emergency through colors and flickering.

If a person or object is detected by the anti-collision
sensor 80, a movement command may be output from a
loudspeaker 28 of the shuttle 20.

The safety board system may also comprise a passenger
detection device 90 that obtains information on the number
or location of passengers boarding the shuttle 20, and during
the movement of the shuttle 20, if the passenger detection device 90 detects a passenger who has left a seat 21, a seating command may be output from the loudspeaker 28 of the shuttle 20.

The control device 40 may stop the operation of the driving device 30 until all passengers are seated in the seats 21.

According to the safety board system of the present invention, the shuttle moving along a predetermined travel path within a travel area set on a pedestrian crossing travels back and forth between the lift platforms on both sides of the pedestrian crossing to transport passengers to the opposite lift platforms, thereby directly assisting the movement of mobility disadvantaged persons crossing the pedestrian crossing, leading to rapid and safe crossing.

In particular, it is possible to minimize a reduction in the width of the sidewalk due to the presence of the lift platform installed on the sidewalk, thereby reducing inconvenience to pedestrians and maximizing space utilization.

Depending on the embodiment, the speeding detection device for detecting the speed of vehicles passing through the pedestrian crossing suppresses speeding vehicles, thereby reducing accidents caused by the speeding vehicles and enabling the establishment of safe traffic order.

Furthermore, an openable threshold is provided at the bottom of the door unit of the shuttle, and thus it is possible to prevent passengers' belongings from falling out of shuttle while traveling or stopping. In addition, a screen door is installed on the lift platform to integrate with the signal system of the control device so that the shuttle travels only when the screen door is closed, the door unit is closed, a safety bar provided at the seat is lowered, or the signal system is changed, thereby ensuring the passengers' safe boarding Additionally, it is possible to allow nearby pedestrians to quickly perceive the state of the shuttle through the color change of the LED lamp installed outside the shuttle, thereby ensuring the safety of pedestrians.

Besides, by incorporating a camera that captures both the interior and exterior of the shuttle and a safety bell that is connected to the National Police Agency, it is possible to reduce the occurrence of crimes inside the shuttle and around the lift platform.

Therefore, according to the safety board system of the present invention, it is possible to allow mobility disadvantaged persons to safely complete their crossing within a predetermined pedestrian signal time, contribute to reducing the occurrence of traffic accidents on the pedestrian crossing to enhance the smooth flow of road traffic, and guides pedestrians to walk on the right side of the pedestrian crossing, thereby ensuring the pedestrian's safety as well.

Moreover, it is possible to create a new concept of a city and enhance the city's brand power based on the design in terms of urban aesthetics.

Furthermore, if a passenger who has left the seat is detected by the passenger detection device, a seating command may be output from the loudspeaker of the shuttle, and the operation of the driving device may be stopped until all passengers are seated, thereby providing a safe environment for use.

In addition, if a person or object present on the travel path is detected by the anti-collision sensor, a movement command may be output from the loudspeaker of the shuttle, and in particular, if a person or object present within a danger distance is detected, the brake system may be activated, and the pedestrian signal of the traffic signal system may be extended.

Additionally, a display unit may be installed on one side of the shuttle to provide various types of information and advertisements.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, preferred embodiments of the present invention will be described in detail with reference to the accompanying drawings, but if it is determined that a detailed description of a related known function or configuration would unnecessarily obscure the gist of the present invention, the detailed description will be omitted.

In the following description, the terms "entry end" and "exit end" are based on the direction when a shuttle 20 enters a lift platform 10, and the "entry end" is defined as an end closer to the lift platform 10 when the shuttle 20 moving along a travel path C approaches the lift platform 10, and the "exit end" is defined as an end far from the lift platform 10 as it is located on the opposite side of the "entry end". Accordingly, the exit end and the entry end of the shuttle 20 may be switched alternately depending on the travel direction.

Figure 1A:
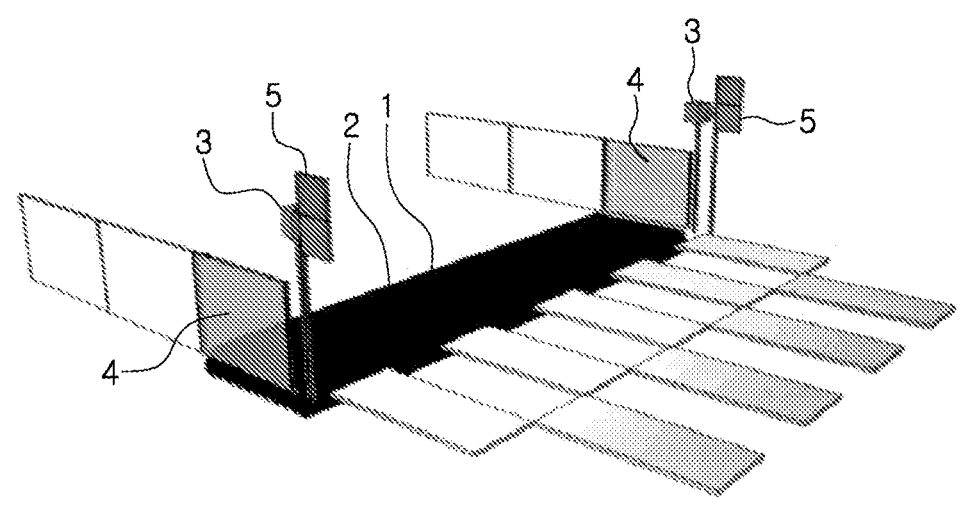
FIGS. 1A to 1C are conceptual diagrams showing prior-art documents proposed for mobility disadvantaged persons walking on pedestrian crossings.
Figure 1B:
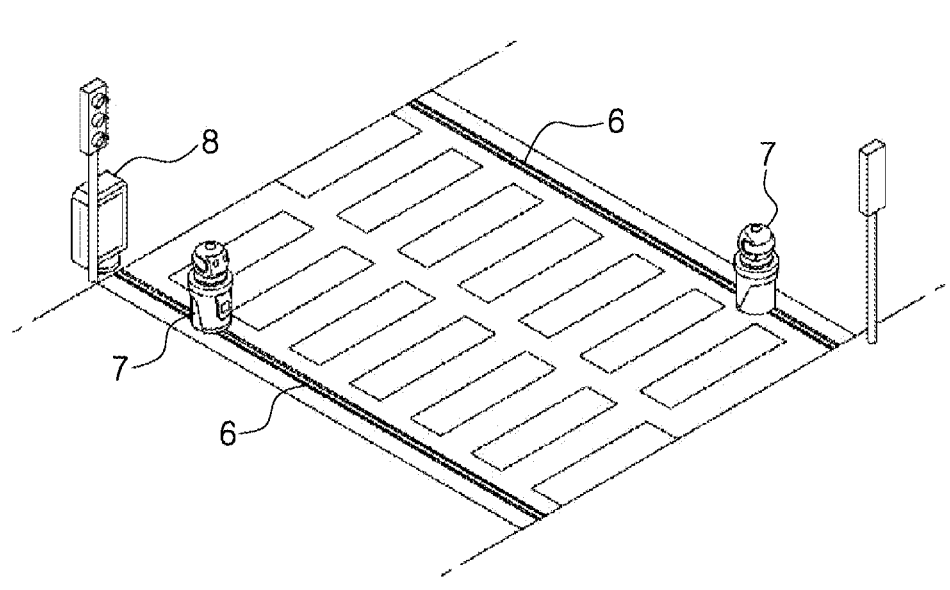
Figure 1C:
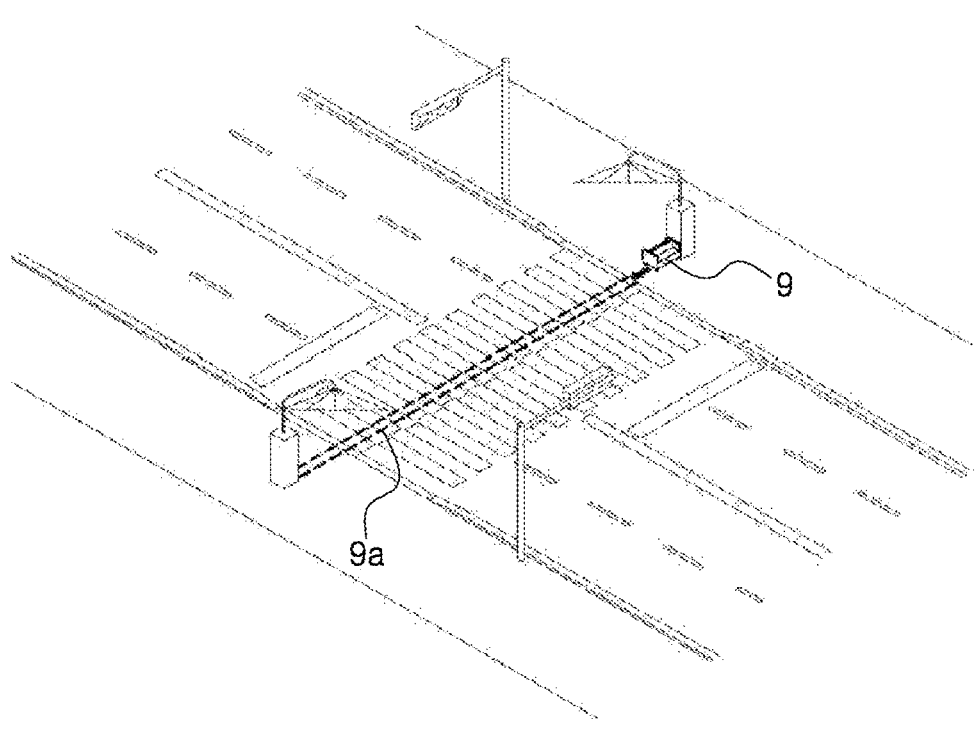
Figure 2A:
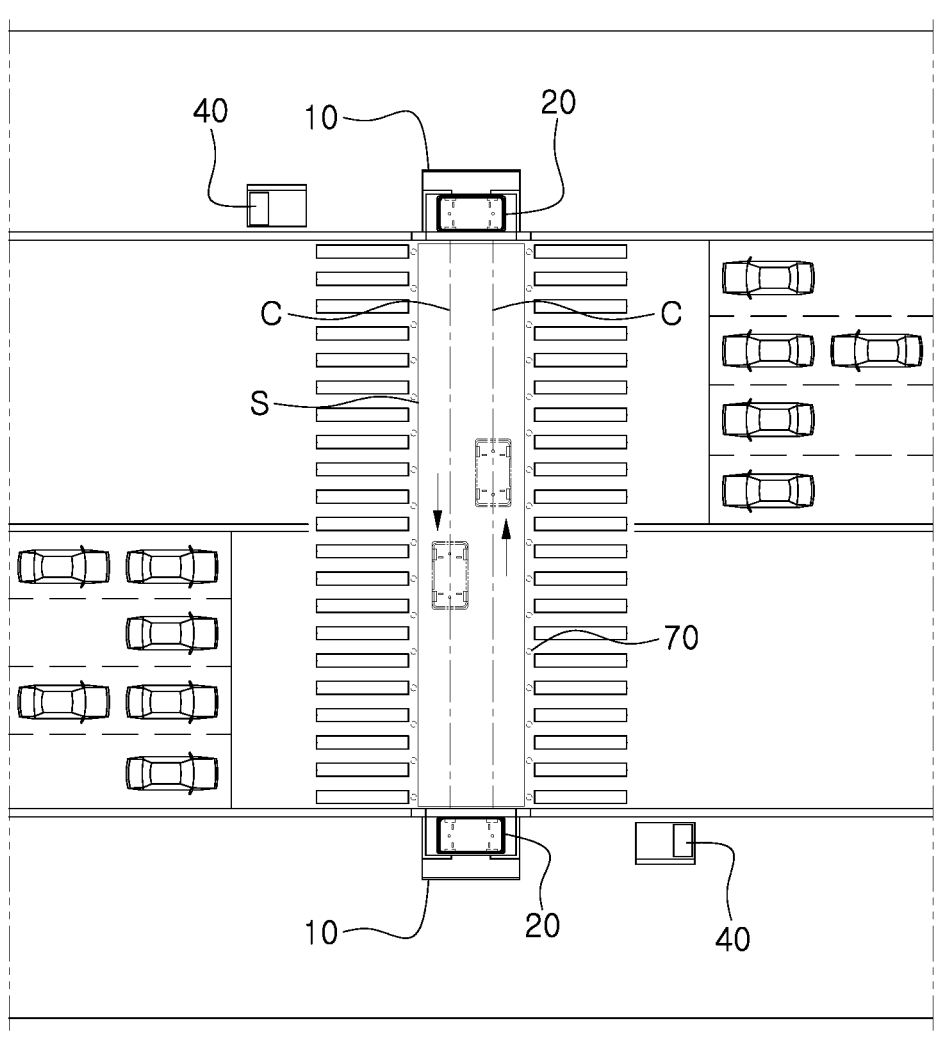
FIGS. 2A to 2C are plan views schematically showing safety board systems according to different embodiments of the present invention.
Figure 2B:
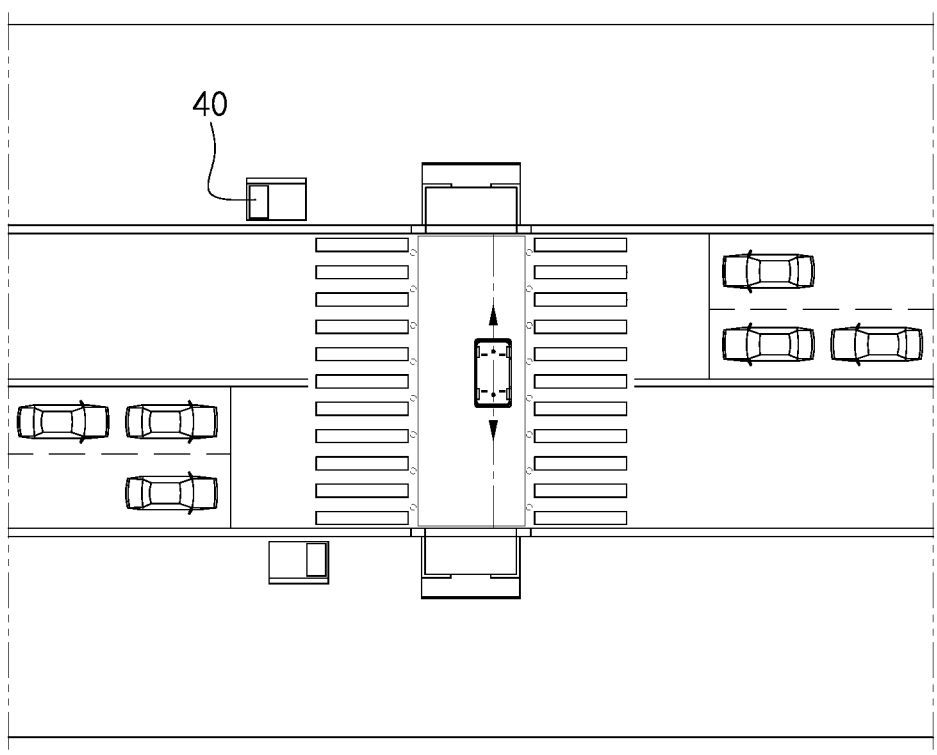

As shown in FIGS. 2A and 2B, the pedestrian crossing safety board system according to an embodiment of the present invention includes a lift platform 10, a shuttle 20, a driving device 30, and a control device 40, in which the shuttle 20 moving along a travel path C by means of the driving device 30 travels back and forth between a pair of lift platforms 10 to transport passengers to the opposite lift platforms 10.

As shown in FIG. 2A, the safety board system according to an embodiment of the present invention may be configured in a two-way manner where a pair of shuttles 20 travel back and forth in different directions along a pair of travel paths C, and as shown in FIG. 2B, a safety board system according to another embodiment of the present invention may be in a one-way manner where a single shuttle 20 travels back and forth along the travel path C.

Figure 2C:
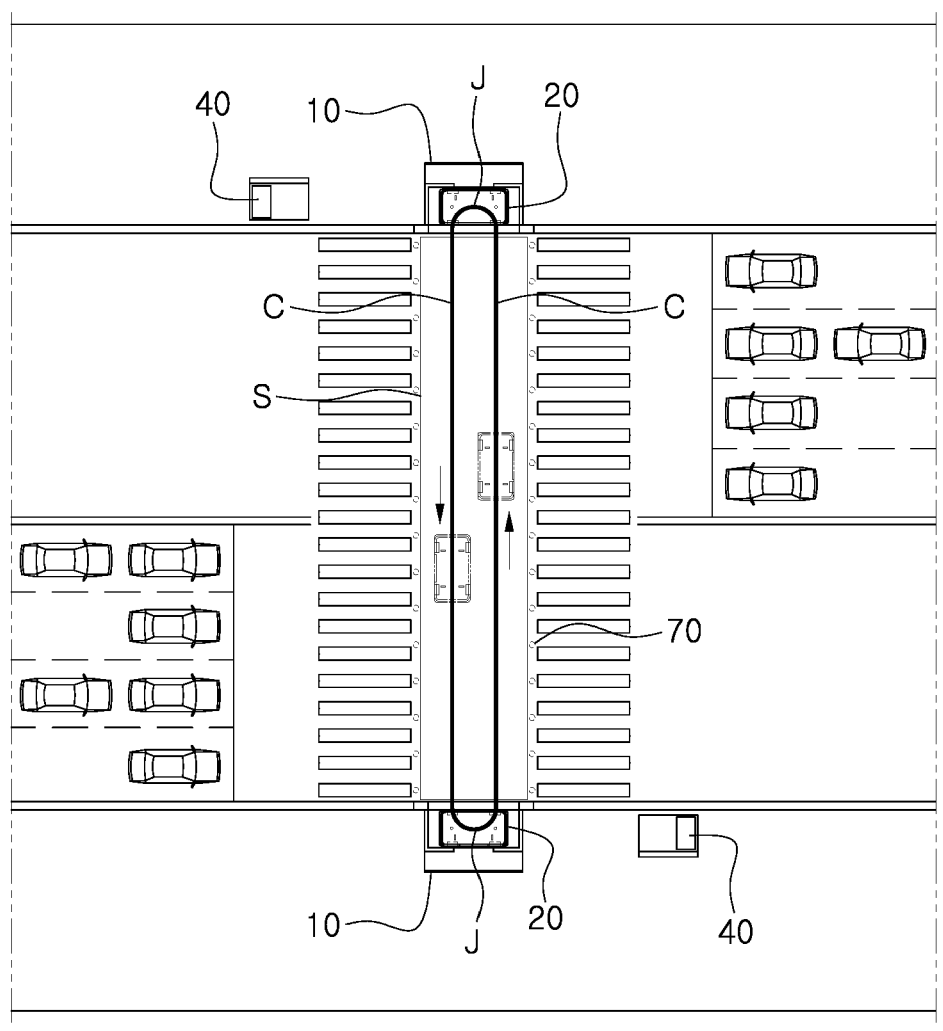

Moreover, both ends of the pair of travel paths C included in the two-way safety board system may be connected to each other to form a loop structure. That is, as shown in FIG. 2C, both ends of the pair of travel paths C formed in a direction crossing the road may be connected to each other by a pair of direction changing units J to form a loop structure, where each shuttle 20 always moves in a different direction on the straight travel path C, moves to another adjacent travel path C through the direction changing unit J, and then moves in a different direction again.

Such a travel path C may be formed by an image line applied to allow the shuttle 20 to move along a predetermined path within a travel area S set on the pedestrian crossing, an electromagnetic guide rail 60 embedded along a predetermined path within the travel area S, or a guide signal generating means installed on the lift platform 10 to transmit a guide signal.

In this case, the travel area S is a virtual area, and the image line or guide rail may be formed as a single line in the travel area S, or may be formed as a pair of lines on the outside to form the travel area S.

The driving device 30 of the present invention drives the shuttle 20 in an autonomous manner. In other words, the driving device 30 of the present invention may comprise the function of steering the shuttle 20 by detecting the image line captured by a camera along the travel path C, the function of steering the shuttle 20 in response to the electromagnetic guide rail 60, or the function of steering the shuttle 20 in response to the guide signal, and this autonomous method allows the shuttle 20 to navigate by itself under the control of the driving device 30 and move to the opposite lift platforms 10, implementing a self-driving method.

Although not shown, the self-driving method may be implemented by providing a rail extending along the travel path C on a road surface, and providing a roller moving along the rail at the bottom of the shuttle 20, such that the shuttle 20 moves along the physical rail, and it is defined that the corresponding embodiment is also included in the autonomous method.

The travel path C may be formed in the center of the pedestrian crossing or on both sides of the pedestrian crossing. However, when the travel path C is formed on both sides of the pedestrian crossing, there is a risk of collision with a vehicle that might cross the stop line, and thus it is desirable to have the travel path C formed in the center of the pedestrian crossing to avoid such a collision.

However, when the travel path C is formed in the central of the pedestrian crossing, there is a possibility of interference with pedestrians, and thus the system may be implemented in such a manner that a boundary facility 70 such as bollards or plates is selectively presented and then disappears at the boundary of the travel area S where the shuttle 20 moves. This way, the pedestrians can be alerted by the presence of the boundary facility 70, and when the pedestrian signal changes again, the boundary facility 70 disappears again, allowing the pedestrians to move without any interference.

Figure 3:
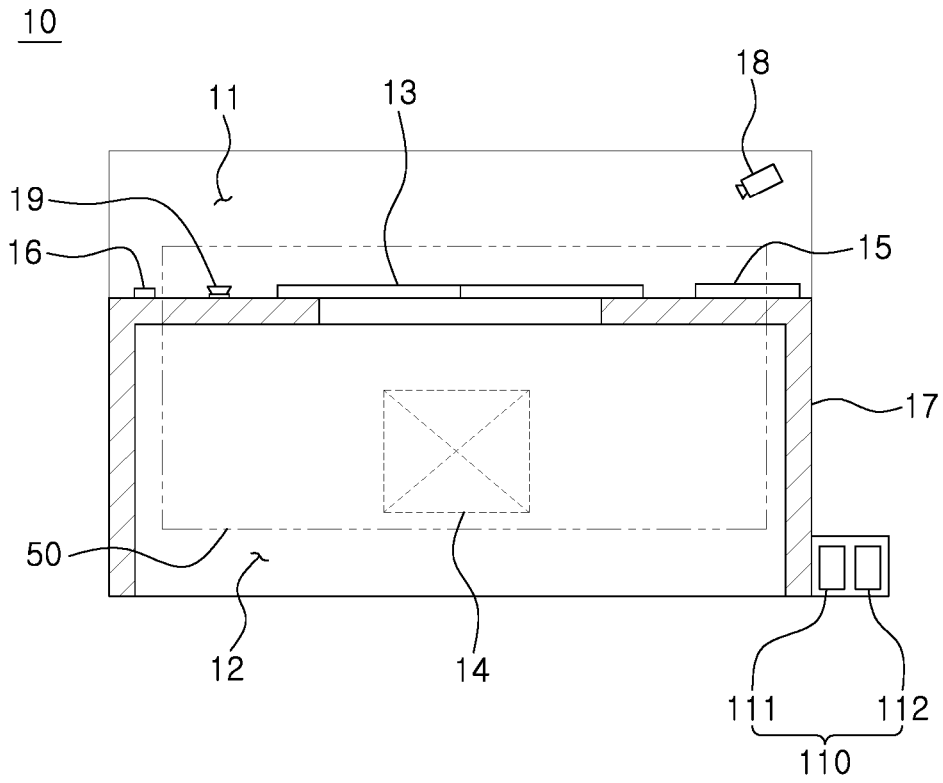
FIG. 3 is a plan view schematically showing a lift platform according to an embodiment of the present invention.

The lift platform 10 is a structure formed adjacent to the pedestrian crossing, and it is desirable to lower the boundary so that a part of the sidewalk is recessed. As shown in FIGS. 2A and 2B, the lift platforms 10 are formed on sidewalks on both sides of the pedestrian crossing. As shown in FIG. 3, each lift platform 10 may comprise a waiting area 11 where passengers wait, a parking area 12 where the shuttle 20 stops, a screen door 13 that guides the passengers to safely get on and off, a charging device 14 for charging the shuttle 20 stopped at the parking area 12, a display device 15 for displaying information and advertisements, a relief bell 16 associated with the National Police Agency, a fence 17 for separating the lift platform 10 from the sidewalk, and a roof for protecting the passengers and pedestrians from sunlight, rain or snow.

The screen door 13 may be opened before the pedestrian signal by the control device 40 connected to the signal system of the pedestrian crossing and is closed after the passengers have boarded. Preferably, the screen door 13 may be configured to be closed after all passengers have boarded the shuttle 20 based on the analysis of the image captured by a camera 18 provided on the lift platform 10.

Meanwhile, in order to promote the safety of passengers, the shuttle 20 may be operated only when the door unit 22 has been closed or a safety bar for preventing the passengers from being thrown out of the shuttle 20 has been lowered, even after all passengers waiting on the lift platform 10 have boarded the shuttle 20.

Moreover, when getting off, the screen door 13 may be opened after the shuttle comes to a complete stop and the pedestrian signal changes, thereby allowing the passengers to safely get off and preventing pedestrians from jaywalking in advance.

Furthermore, it goes without saying that before the opening and closing of the screen door 13, an announcement to alert passengers may be output through the loudspeaker 19.

In addition, the charging device 14 may be configured as a plug-in charger that protrudes from the lift platform 10 and connects to the shuttle 20 during the early morning hours when the shuttle 20 is not running. Alternatively, it may be configured as a wireless charger with an electromagnetic field formed in the parking area 12, allowing the shuttle 20 to be charged with an induced current during its stationary period.

Additionally, a solar power generation device 50 may be provided at the top of the lift platform 10 to cover a part of the electricity used in the lift platform 10 through self-generation, and the solar power generation device 50 may also be provided at the top of the shuttle 20 for its power supply.

When installing such a lift platform 10 on the sidewalk, the waiting area 11 may be formed to have a sufficient area and to face the door unit 22 formed on the side of the shuttle 20, which has changed its direction by a certain angle from the travel path C parallel to the pedestrian crossing, thereby minimizing the area occupied by the lift platform 10 on the sidewalk and minimizing inconvenience to pedestrians walking on the sidewalk.

That is, it is preferable that the shuttle 20 is formed to have an elongated structure to transport as many passengers as possible in a single operation. However, in the case where the lift platform 10 is configured so that the elongated shuttle 20 stops in a way that intersects with the sidewalk, the waiting area 11 may not have a sufficient area depending on the structure of the sidewalk, and the width of the sidewalk where pedestrians can move is significantly reduced, causing inconvenience to pedestrians.

Therefore, it is desirable that the parking area 12 of the lift platform 10 is configured to allow the shuttle 20, which has changed its direction by a certain angle from the travel path C, to be parked therein, and the waiting area 11 is configured to face the door unit 22 of the shuttle 20 parked in the parking area 12. The angle at which the direction changes is typically 90°, which is the most advantageous; however, various other angles may be used depending on the specific characteristics of the sidewalk or road, and even in this case, it is desirable that the angle is configured in a way that ensures sufficient space for the waiting area 11 while minimizing any inconvenience to pedestrians due to a reduction in sidewalk width.

The shuttle 20 moves along a predetermined travel path C within the travel area S set on the pedestrian crossing to travel back and forth between the pair of lift platforms 10 formed on both sides of the road and transport passengers to the opposite lift platforms 10.

Figure 4A:
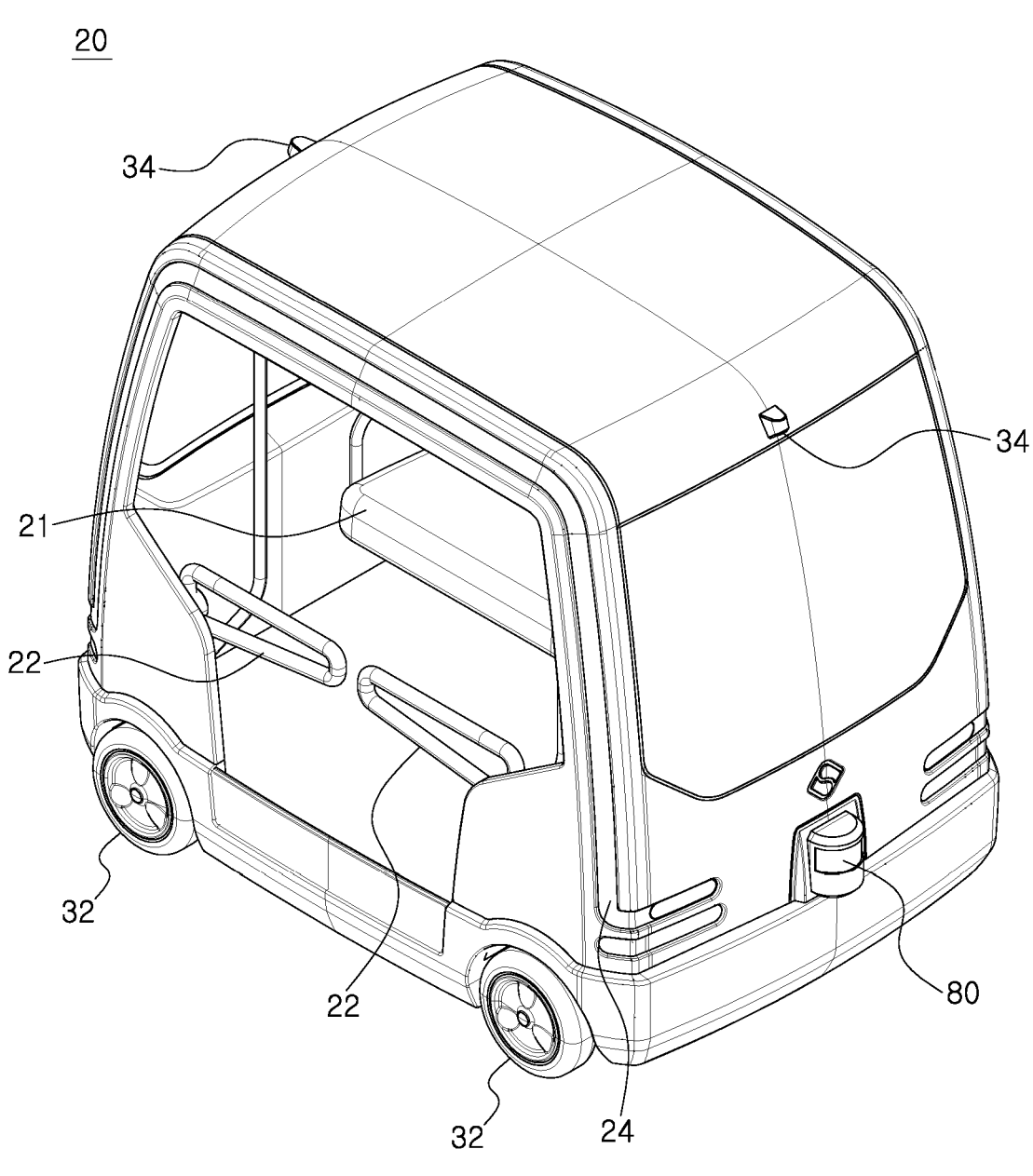
FIGS. 4A to 4C are structural diagrams of a shuttle according to an embodiment of the present invention.
Figure 4B:
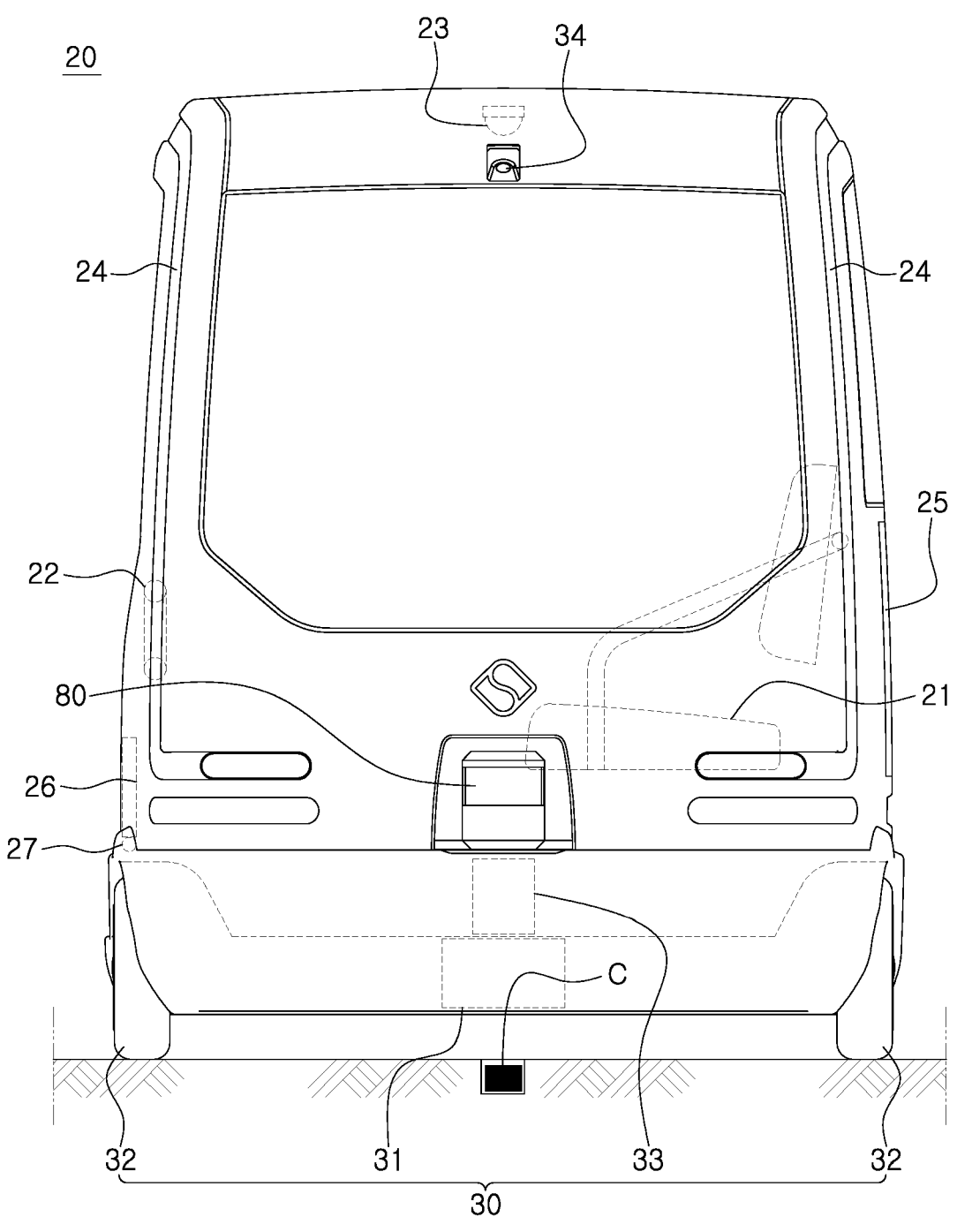
Figure 4C:
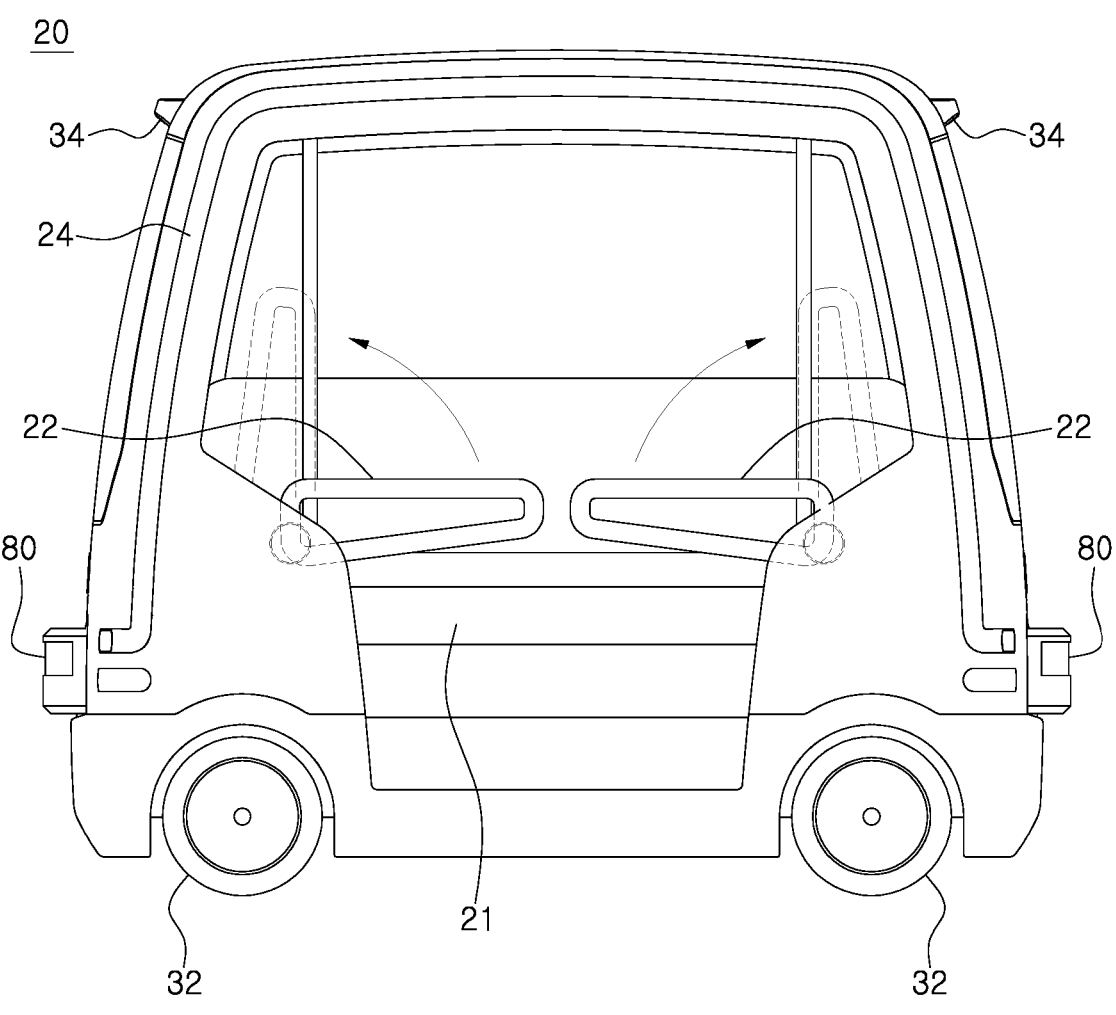

To this end, as shown in FIGS. 4A to 4C, the shuttle 20 may comprise a seat 21 for passenger seating, a door unit 22 for getting on and off, one or more cameras 23 for capturing images of both the interior and exterior of the shuttle 20, and one or more LED lamps 24 mounted on the outside of the shuttle 20 to display the state of the shuttle 20 or the signal system. The LED lamps 24 may be arranged in a line extending from the front to the rear of the shuttle 20 and operate in a way that turns green while traveling, turns red while stopping, and alternates between red and green in the event of an emergency, thereby indicating information such as the state of the shuttle's signal system, the state of normal operation, or an emergency situation such as a sudden entry of a vehicle or pedestrian.

Meanwhile, the door unit 22 is configured as an open structure on one side of the shuttle 20 and may comprise a safety bar (not shown) that operates to control the passengers' getting on and off and prevent the passengers from being thrown out of the shuttle 20 while traveling. The door unit 22 may be opened after the screen door 13 is opened and closed after the screen door 13 is closed by the control device 40. The door unit 22 is configured to face the screen door 13 when the shuttle 20 is parked in the parking area 12. In this way, the door unit 22 formed on the side of the elongated shuttle 20 may have a wide width, achieving a quick and safe getting on and off environment.

In addition, there may be an openable threshold 26 at the bottom of the door unit 22 formed on the side of the shuttle 20 to prevent the passengers' belongings from falling out of the shuttle 20 while traveling or stopping. That is, a lower end of the threshold 26 may be connected to a horizontal hinge axis 27 provided in the shuttle 20, and the threshold 26 may be coupled to an actuator (not shown) to rotate around the hinge axis 27 by the operation of the actuator to stand up or fall down. When falling down, it protrudes toward the side of the shuttle 20 and connects to the waiting area 11 of the lift platform 10, achieving a safer getting on and off environment.

Moreover, the shuttle 20 may be equipped with an advertising display unit 25 to display various types of information or advertisements.

The driving device 30 is provided in the shuttle 20 to move the shuttle 20 and may comprise a drive unit 31 consisting of a motor or engine and a plurality of wheels 32 rotated by the drive unit 31 as shown in in FIGS. 4A to 4C. Some of the plurality of wheels 32 may receive power from the drive unit 31 to rotate, or all of the plurality of wheels 32 may receive power from the drive unit 31 to rotate. Alternatively, the drive unit 31 may be installed in each of the plurality of wheels 32 to allow the plurality of wheels 32 to rotate independently.

As such, the driving device 30 is provided in the shuttle 20 to move along with the shuttle 20 and control the overall operation of the shuttle 20. The driving device 30 includes a sensing unit 34 for detecting the position and direction of the travel paths C by recognizing the aforementioned image line, electromagnetic guide rail 60, or guide signal, and a control unit 33 for controlling in real-time the operation, direction and speed of the drive unit 31 according to signals transmitted from the sensing unit 34.

Meanwhile, the control device 40 is intended to control the lift platform 10 and the shuttle 20, and it is preferable to install the control device 40 in a control panel adjacent to the pedestrian crossing, where it can be integrated with the traffic signal system of the pedestrian crossing to perform control functions. The control device 40, the traffic signal system, a power source, a communication module, etc. may be installed together in the control panel.

The control device 40 may be in wired or wireless communication with the control unit 33 of the shuttle 20 through a communication module to be integrated with the signal system, and the control unit 33 for controlling the driving device 30 of the shuttle 20 may also be integrated in the control device 40, instead of the shuttle 20.

This control device 40 has the function of opening and closing the screen door 13 provided on the lift platform 10 in conjunction with the traffic signal of the traffic signal system, the function of turning on and off the LED lamp 24 depending on the state of the shuttle 20, and the function of controlling the driving device 30 in conjunction with the traffic signal.

If an abnormal situation is detected from the sensing unit 34 such as a camera or an anti-collision sensor 80 installed in the shuttle 20, the driving device 30 can decelerate the shuttle 20 or temporarily stop its operation.

According to an embodiment, an anti-collision sensor 80 that detects a person or object such as a vehicle present in the traveling direction of the shuttle 20 may be installed at the shuttle 20 or at a position extending along the traveling direction of the shuttle 20. The anti-collision sensor 80 can determine whether there is a person or object in front thereof using a laser sensor such as lidar or radar or an ultrasonic sensor. Furthermore, the anti-collision sensor 80 can measure in real-time the distance between the shuttle 20 and an object in conjunction with the sensing unit 34 such as a camera.

Figure 5A:
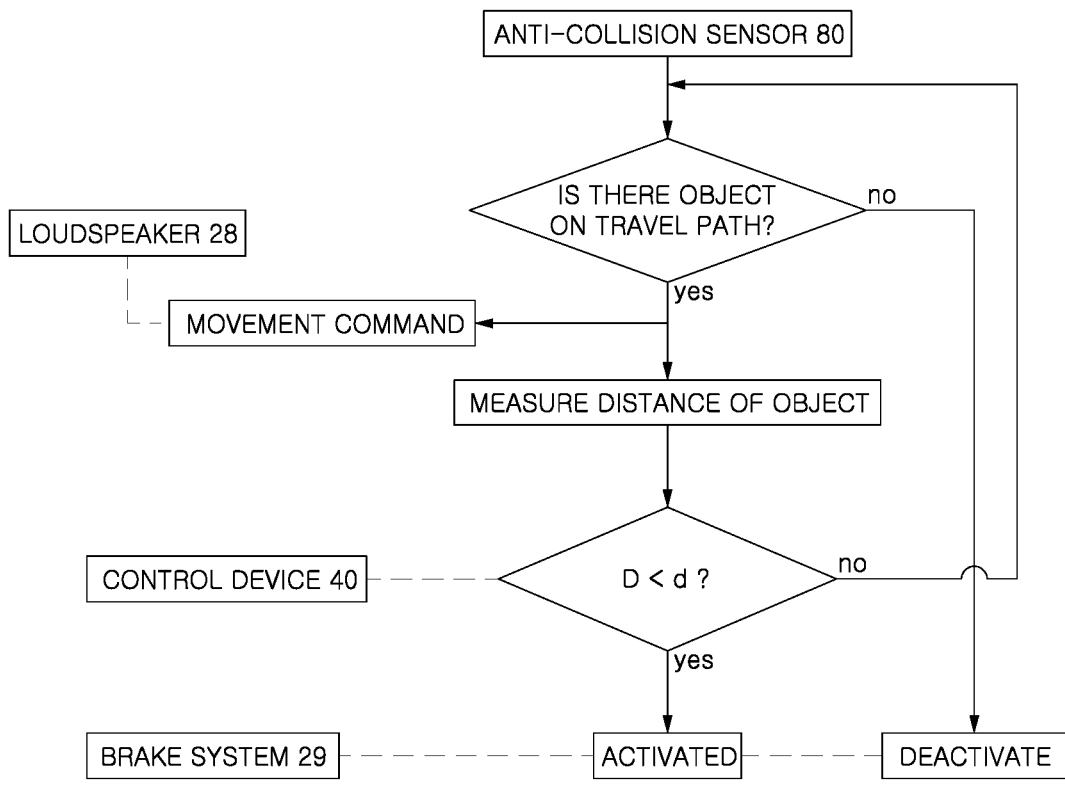
FIGS. 5A and 5B are block diagrams conceptually showing the operating principle of an anti-collision sensor according to various embodiments of the present invention.

Accordingly, as shown in FIG. 5A, if an object is detected by the anti-collision sensor 80, a movement command may be output from the loudspeaker 28 of the shuttle 20. In particular, if the distance (D) of the object detected by the anti-collision sensor 80 falls within a predetermined safe distance (d), the control unit 33 may activate a brake system 29 of the shuttle 20 to decelerate or stop the shuttle 20 so that the shuttle 20 maintains the safe distance from the sensed object.

In other words, if the anti-collision sensor 80 detects an object at a distance greater than the safe distance (d), a movement command is immediately output; however, if the sensed object does not move until it reaches the safe distance (d), the shuttle 20 will decelerate and ultimately come into a stop. In some cases, the driving device 30 may communicate with the control device 40 to extend the pedestrian signal time of the traffic signal system, thereby preventing accidents caused by traveling vehicles in advance.

Figure 5B:
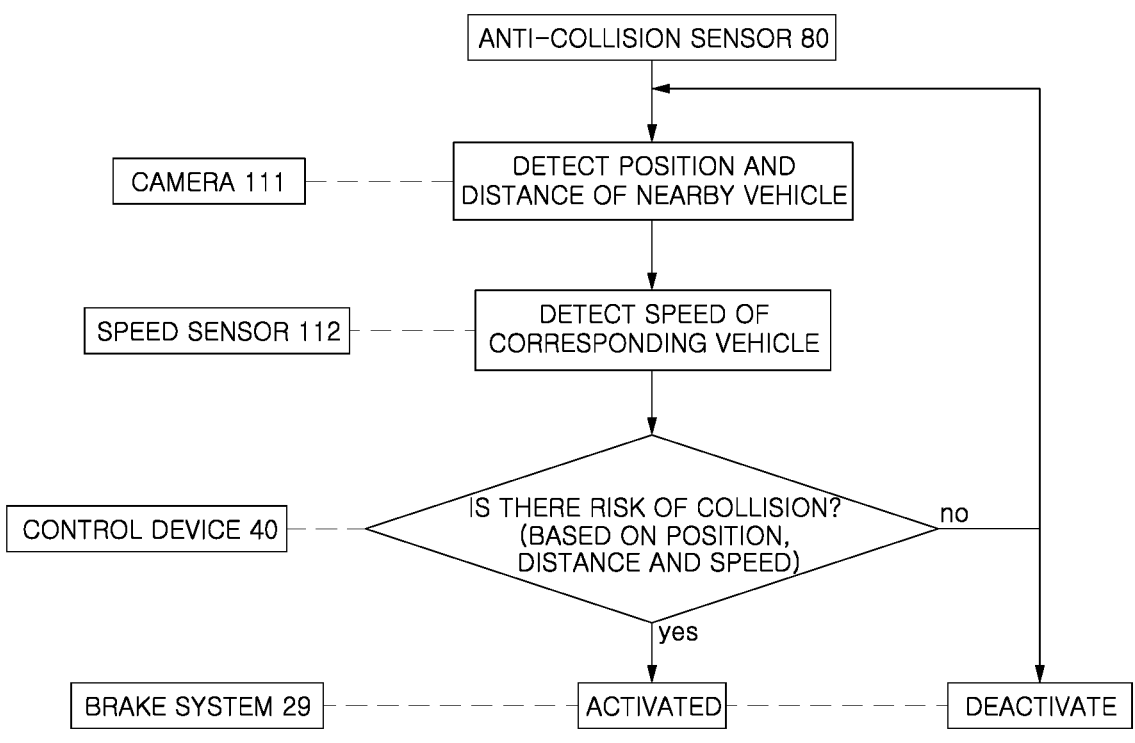
Figure 6:
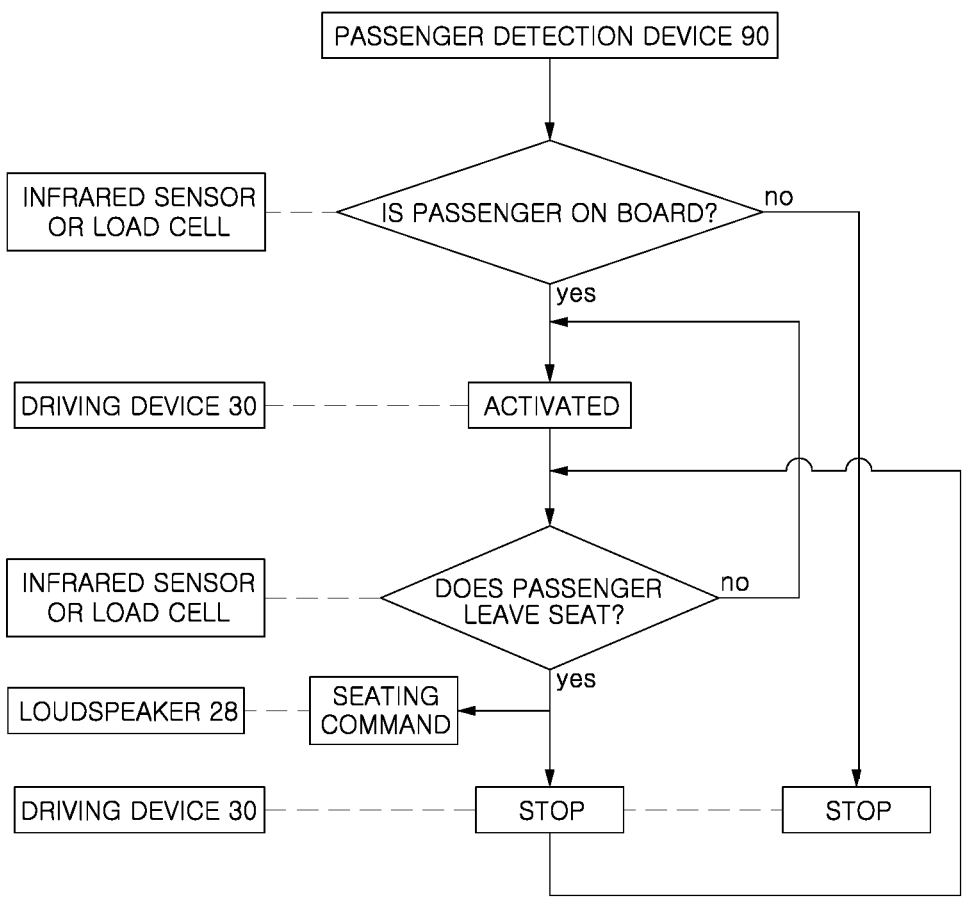
FIG. 6 is a block diagram conceptually showing the operating principle of a passenger detection device according to an embodiment of the present invention.

In addition, as shown in FIG. 5B, if the position and distance of a vehicle traveling nearby or another moving object is detected by a camera 111 or the anti-collision sensor 80, it is determined whether there is a risk of collision based on the speed of the vehicle or object measured by a speed sensor 112, and if a collision is expected, the brake system 29 can be activated in advance to decelerate or stop the shuttle 20.

Meanwhile, the driving device 30 may have the function of preventing the shuttle 20 from moving in the absence of passengers to reduce unnecessary energy consumption. To implement this function, a passenger detection device 90 may be installed in the shuttle 20, and the passenger detection device 90 may be made using various sensors. In one embodiment, an infrared sensor may be used to immediately detect the number and position of passengers, and in another embodiment, a load cell may be installed under the seat 21 to determine the number and position of passengers.

In particular, during the movement of the shuttle 20, if the passenger detection device 90 detects a passenger who has left the seat 21, a seating command may be output from the loudspeaker 28 of the shuttle 20, and the movement of the shuttle 20 may be stopped until all passengers are seated. Furthermore, based on the number of passengers detected by the passenger detection device 90, the number of allowed passengers can be limited within the permitted capacity, creating a safer environment for use.

Meanwhile, an anti-deviation device that prevents the shuttle 20 moving along the travel path C within the travel area S from deviating from the travel area S due to a failure or error may be installed at the shuttle 20 or at a position extending along the traveling direction of the shuttle 20. The anti-deviation device captures the image line formed to extend along the edge of the travel area S.

If the anti-deviation device is installed at the shuttle 20, it may be implemented in the form of a camera, which is the aforementioned sensing unit 34, to determine the direction and distance of the boundary line. If the position of the shuttle 20 identified by the anti-deviation device is within a set range from the boundary line, the driving device 30 may steer the shuttle 20 to move away from the boundary line toward the target lift platform 10.

Therefore, even if the shuttle 20 is not guided to the travel path C using a physical guide means such as a rail, the safe movement of the shuttle 20 becomes possible.

Meanwhile, a speeding detection device 110 may be installed on the body of the shuttle 20 or the lift platform 10. As shown in FIG. 3, the speeding detection device 110 includes a camera 111 for capturing an image of a vehicle traveling nearby and a speed sensor 112 for detecting a traveling speed of the corresponding vehicle. Information obtained from the camera 111 and the speed sensor 112 is transmitted to the control device 40, and if the detected traveling speed of the vehicle exceeds a predetermined reference speed, the control device 40 transmits the image and the traveling speed information of the vehicle to a designated server. According to the speeding detection device 110 as described above, it is possible to prevent the vehicles from speeding through the pedestrian crossing, thereby ensuring the safety of pedestrians crossing the pedestrian crossing and mobility disadvantaged persons boarding the shuttle.

Meanwhile, the safety board system may comprise a direction changing device 120 that rotates the shuttle 20 so that the door unit 22 of the shuttle 20 entering the lift platform 10 faces the screen door 13 of the lift platform 10, and rotates the shuttle 20 so that the shuttle 20 exiting from the lift platform 10 is parallel to the travel path C, while minimizing the turning radius of the shuttle 20.

Figure 7:
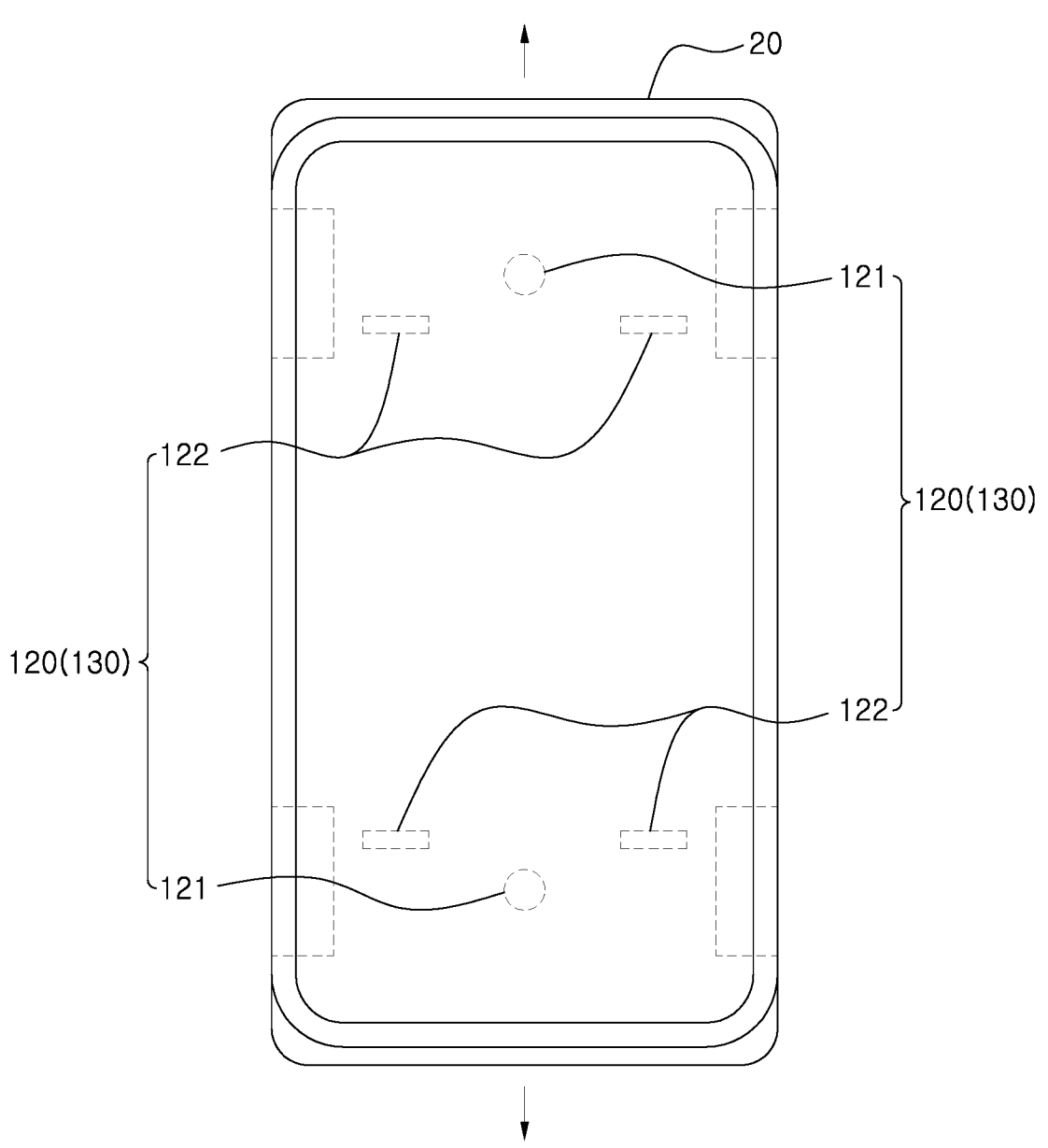
FIG. 7 is a plan view schematically showing a direction changing device according to an embodiment of the present invention.
Figure 10:
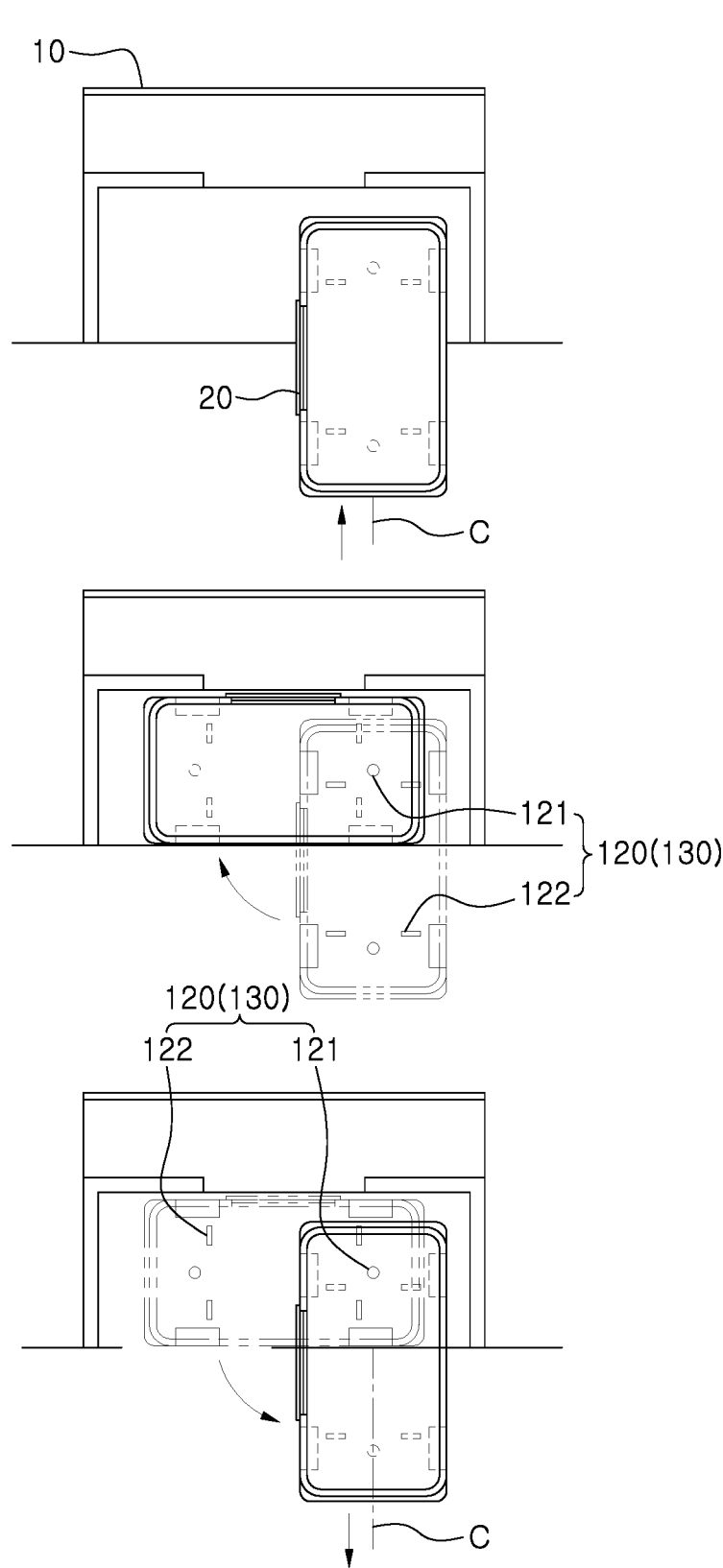
FIG. 10 is a plan view showing that a shuttle enters and exits a lift platform by a direction changing device according to an embodiment of the present invention.

As shown in FIGS. 7 and 10, the direction changing device 120 according to an embodiment of the present invention may form a pair of entry-end-centered-rotation units 130 that are symmetrically arranged in the forward and backward directions of the shuttle 20. The pair of entry-end-centered-rotation units 130 are configured such that, when the shuttle 20 enters the lift platform 10, the entry-end-centered-rotation unit 130 located at the exit end operates to rotate the shuttle 20 by a predetermined angle around the entry end, allowing the shuttle 20 to enter the lift platform 10, and once the entry is completed, the same entry-end-centered-rotation unit 130 used during entry operates again to rotate the shuttle 20 again by a predetermined angle around the entry end, allowing the shuttle 20 to exit along the same travel path taken at the time of entry.

Preferably, the shuttle 20 may enter by rotating 90° and exit by rotating 90° again; however, for the convenience of boarding, the waiting area 11 may be provided with sufficient space depending on the specific characteristics of the sidewalk and road, and in this state, the shuttle 20 may enter at an angle other than 90° and then exit at the angle again as well, taking into account the utilization of space.

This direction changing device 120 is suitable for a one-way safety board system where one shuttle 20 travels back and forth; however, it can be also be applied to a two-way safety board system where two shuttles 20 travel back and forth, considering the conditions such as environments with the pedestrian crossing. In the two-way safety board system, the entry end of one lift platform 10 becomes the exit end of the other lift platform 10. Accordingly, on one lift platform 10, one of the entry-end-centered-rotation units 130 operates repeatedly to allow the shuttle 20 to enter and exit, and on the other lift platform 10, the other entry-end-centered-rotation unit 130 operates repeatedly to allow the shuttle 20 to enter and exit.

As such, the entry-end-centered-rotation units 130 that are symmetrically arranged in the forward and backward directions of the shuttle 20 according to an embodiment of the present invention may comprise a pivot axis 121 and a plurality of wheel units 122. The pivot axis 121 is accommodated in the bottom of the entry end of the shuttle 20 to protrude therefrom, and the wheel units 122 are accommodated in the shuttle 20 at positions different from the pivot axis 121 and protrude along with the pivot axis 121 from the bottom of the shuttle 20 to rotate toward the side of the shuttle 20 while being in contact with the ground, allowing the shuttle 20 to rotate around the pivot axis 121.

In this way, the pivot axis 121 and the wheel units 122 that constitute the entry-end-centered-rotation units 130 are configured to protrude to a height lower than the wheels 32 to allow the wheels 32 to be separated from the ground, and after the shuttle 20 has changed its direction, they may be accommodated inside the shuttle 20 to allow the shuttle 20 to travel by the wheels 32.

Figure 8:
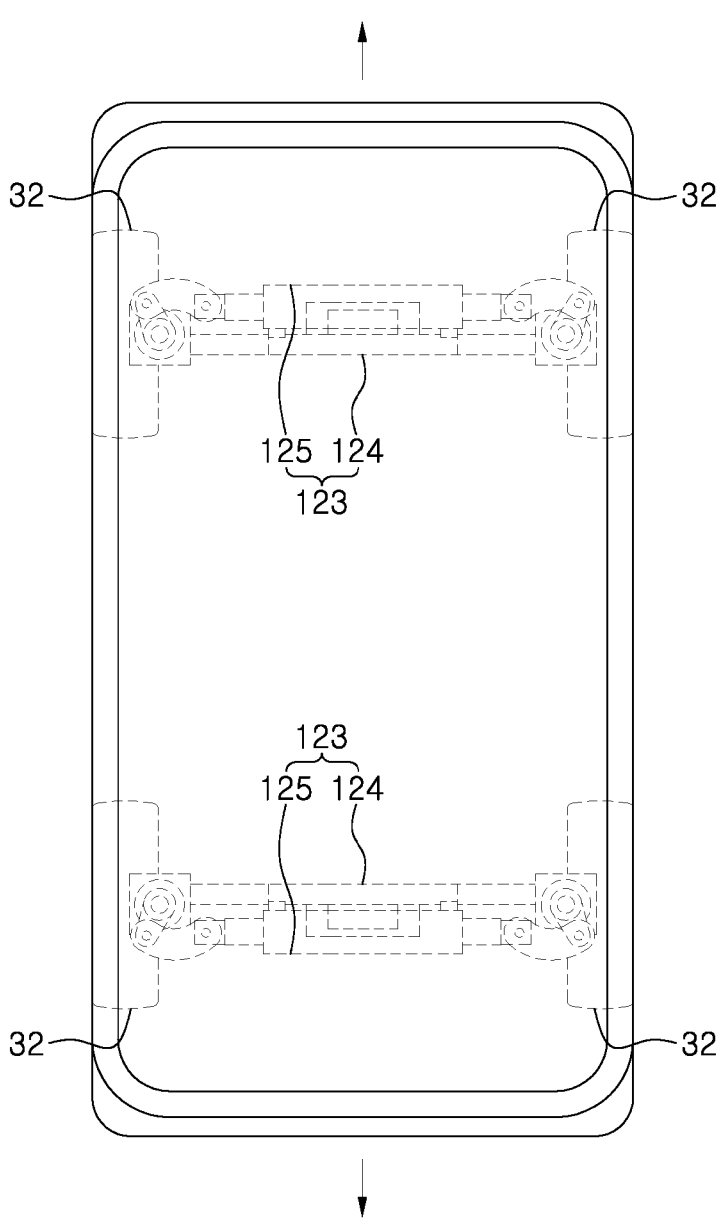
FIG. 8 is a plan view schematically showing a direction changing device according to another embodiment of the present invention.
Figure 9:
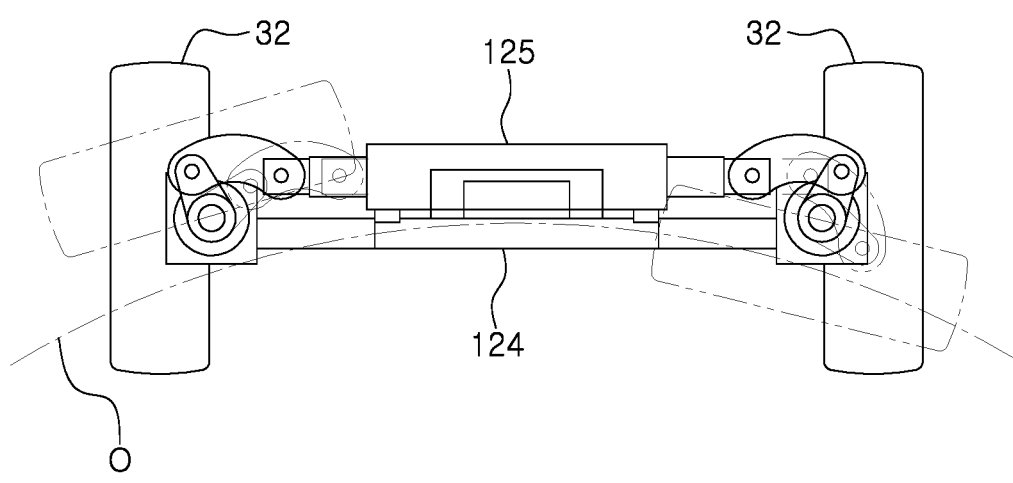
FIG. 9 is a plan view showing that a pair of wheels are adjusted to different angles by a steering unit according to an embodiment of the present invention.

As shown in FIGS. 8 and 9, the entry-end-centered-rotation units 130 according to another embodiment of the present invention may comprise a steering unit 123 that is connected to a pair of wheels 32 provided at the exit end of the shuttle 20 to form the driving device 30 and configured to change the direction of each of the connected wheels 32 at different predetermined angles to rotate the shuttle 20 around the entry end by the driving of the pair of wheels 32 after the direction change.

In this case, the steering unit 123 may comprise a support 124 that supports a pair of wheels 32 in a steerable manner, and a steering cylinder 125 that is connected to the pair of wheels 32 supported by the support 124 to change the direction of the wheels 32. The steering cylinder 125 changes the direction of each wheel 32 toward the side of the shuttle 20 at different predetermined angles so that each wheel 32 has a posture at each position, which is parallel to the tangent line of a circle (O) with its center at the rotation center of the shuttle 20, allowing the shuttle 20 to rotate around the entry end by the driving of the pair of wheels 32 after the direction change.

Figure 11:
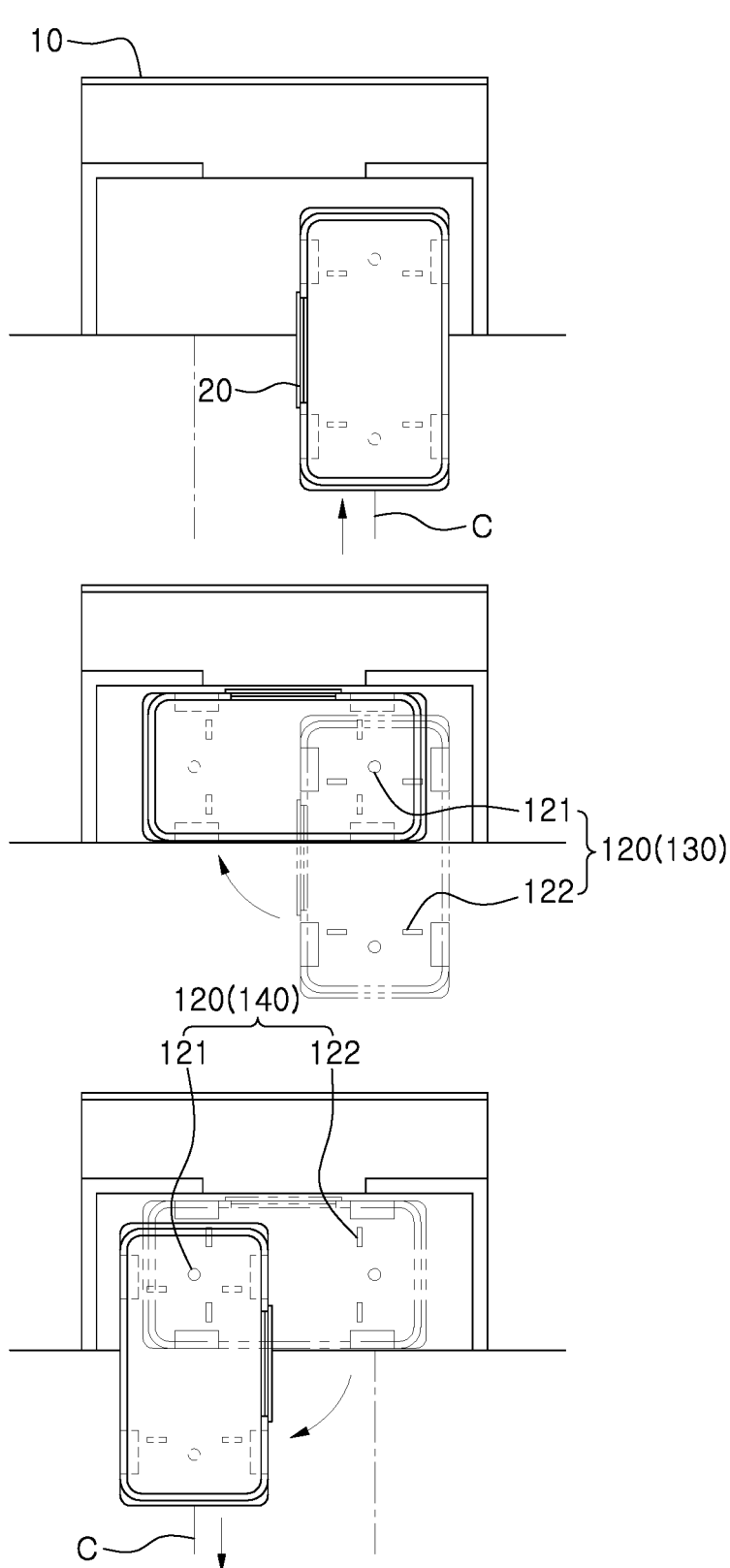
FIG. 11 is a plan view showing that a shuttle enters and exits a lift platform by a direction changing device according to another embodiment of the present invention.

On the other hand, as shown in FIG. 11, the direction changing device 120 according to another embodiment of the present invention may comprise the entry-end-centered-rotation unit 130 and an exit-end-centered-rotation unit 140 that is provided in the shuttle 20 at a position different from the entry-end-centered-rotation unit 130 and configured to rotate the entered shuttle 20 by a predetermined angle around the exit end to exit along a travel path C different from the travel path C taken at the time of entry. This direction changing device 120 is suitable for a two-way safety board system were two shuttles 20 move along different travel paths C.

Meanwhile, like the entry-end-centered-rotation unit 130, the exit-end-centered-rotation unit 140 may also comprise a pivot axis 121 and a plurality of wheel units 122 or may comprise a steering unit 123 that is connected to a pair of wheels 32 provided at the entry end of the shuttle 20 to form the driving device 30 and configured to change the direction of each of the connected wheels 32 at different predetermined angles to rotate the shuttle 20 around the exit end by the driving of the pair of wheels 32 after the direction change. These components of the exit-end-centered-rotation unit 140 are substantially the same as the entry-end-centered-rotation unit 130, except for the operation direction, and thus a detailed description of the specific components of the exit-end-centered-rotation unit 140 is omitted.

As described above, the exit end and the entry end of the shuttle 20 are switched alternately depending on the travel direction, and thus although the entry-end-centered-rotation unit 130 and the exit-end-centered-rotation unit 140 are physically implemented by the same direction changing device 120, they are also switched alternately depending on the travel direction.

The entry-end-centered-rotation unit 130 and the exit-end-centered-rotation unit 140 can minimize the turning radius of the shuttle 20 to allow the shuttle to smoothly change its direction even in a narrow space, thereby minimizing the area of the parking area 12 required for the installation of the lift platform 10, and minimizing the reduction in the width of the sidewalk due to the presence of the lift platform 10.

It will be appreciated by those skilled in the art to which the present invention pertains that the pedestrian crossing safety board system according to the present invention as described above can be implemented in other specific forms without changing the technical spirit or essential features of the present invention.

Therefore, the embodiments described above should be understood as illustrative in all aspects, instead of limiting. The scope of the present disclosure is defined not by the detailed description, but by the appended claims and their equivalents, and the meaning and scope of the claims and all changes or modifications derived from their equivalents should be construed as being included in the scope of the present disclosure.

14

| [Description of reference numerals] | |
|---|---|
| 10: lift platform | 11: waiting area |
| 12: parking area | 13: screen door |
| 14: charging device | 15: display device |
| 16: relief bell | 17: fence |
| 18: camera | 19: loudspeaker |
| 20: shuttle | 21: seat |
| 22: door unit | 23: camera |
| 24: LED lamp | 26: threshold |
| 28: loudspeaker | 29: brake system |
| 30: driving device | 31: drive unit |
| 32: wheels | 33: control unit |
| 34: sensing unit | 40: control device |
| 50: solar power generation device | |
| 60: electromagnetic guide rail | |
| 70: boundary facility | 80: anti-collision sensor |
| 90: passenger detection device | 110: speeding detection device |
| 111: camera | 112: speed sensor |
| 120: direction changing device | 121: pivot axis |
| 122: wheel unit | 123: steering unit |
| 124: support | 125: steering cylinder |
| 130: entry-end-centered-rotation unit | |
| 140: exit-end-centered-rotation unit | |

What is claimed is:

1. A pedestrian crossing safety board system that is installed on a pedestrian crossing to assist the movement of mobility disadvantaged persons, the safety board system comprising:

a pair of lift platforms that are formed on sidewalks on both sides of the pedestrian crossing;

one or more shuttles that move along a predetermined travel path within a travel area set on the pedestrian crossing to travel back and forth between the pair of lift platforms and transport passengers to the opposite lift platforms;

a driving device that moves the shuttles; and a control device that selectively operates the driving device, wherein a pair of travel paths are set on the pedestrian crossing to allow bi-directional movement, and both ends of the pair of travel paths are connected to each other by a pair of direction changing units to form a loop structure in which the shuttles circulate.

2. The pedestrian crossing safety board system of claim 1, wherein the driving device is provided in the shuttle and comprises a plurality of wheels that are rotated by a drive unit and a sensing unit that detects the position and direction of the travel path to steer the wheels.

3. The pedestrian crossing safety board system of claim 1, wherein the lift platform is configured to face a door unit formed on the side of the shuttle when the shuttle changes its direction by a certain angle from the travel path parallel to the pedestrian crossing.

4. A pedestrian crossing safety board system that is installed on a pedestrian crossing to assist the movement of mobility disadvantaged persons, the safety board system comprising:

a pair of lift platforms that are formed on sidewalks on both sides of the pedestrian crossing;

one or more shuttles that move along a predetermined travel path within a travel area set on the pedestrian crossing to travel back and forth between the pair of lift platforms and transport passengers to the opposite lift platforms;

a driving device that moves the shuttles; and a control device that selectively operates the driving device,

a direction changing device that rotates the shuttle such that a door unit of the shuttle entering the lift platform faces the lift platform and rotates the shuttle such that the door unit of the shuttle exiting the lift platform is parallel to the travel path,
wherein the direction changing device comprises:
a pivot axis that is accommodated in an entry end of the shuttle to protrude therefrom; and
a plurality of wheel units that are accommodated in the shuttle at positions different from the pivot axis and protrude along with the pivot axis from the bottom of the shuttle to rotate the shuttle around the pivot axis.

5. The pedestrian crossing safety board system of claim 4, wherein the direction changing device comprises a steering unit that is connected to a pair of wheels provided at an exit end of the shuttle to form the driving device and configured to change the direction of each of the connected wheels at different predetermined angles to rotate the shuttle by the driving of the pair of wheels after the direction change.

6. The pedestrian crossing safety board system of claim 4, wherein the direction changing device forms a pair of entry-end-centered-rotation units that are symmetrically arranged in the forward and backward directions of the shuttle, rotates the shuttle entering the lift platform by a predetermined angle around the entry end to enter the lift platform, and reversely rotates the entered shuttle by a predetermined angle around the entry end to exit along the travel path taken at the time of entry.

7. The pedestrian crossing safety board system of claim 5, wherein the direction changing device forms a pair of entry-end-centered-rotation units that are symmetrically arranged in the forward and backward directions of the shuttle, rotates the shuttle entering the lift platform by a predetermined angle around the entry end to enter the lift platform, and reversely rotates the entered shuttle by a predetermined angle around the entry end to exit along the travel path taken at the time of entry.

8. The pedestrian crossing safety board system of claim 4, wherein the direction changing device forms:
an entry-end-centered-rotation unit that is provided in the shuttle to rotate the shuttle entering the lift platform by a predetermined angle around the entry end to enter the lift platform; and
an exit-end-centered-rotation unit that is provided at a different position of the shuttle to rotate the entered shuttle by a predetermined angle around the exit end to exit along a travel path different from the travel path taken at the time of entry.

9. The pedestrian crossing safety board system of claim 5, wherein the direction changing device forms:
an entry-end-centered-rotation unit that is provided in the shuttle to rotate the shuttle entering the lift platform by a predetermined angle around the entry end to enter the lift platform; and
an exit-end-centered-rotation unit that is provided at a different position of the shuttle to rotate the entered shuttle by a predetermined angle around the exit end to exit along a travel path different from the travel path taken at the time of entry.

* * * * *